March 16, 1948.  LE ROY L. WERNER  2,437,717
VIBRATION DAMPING MOUNT
Filed Oct. 27, 1944
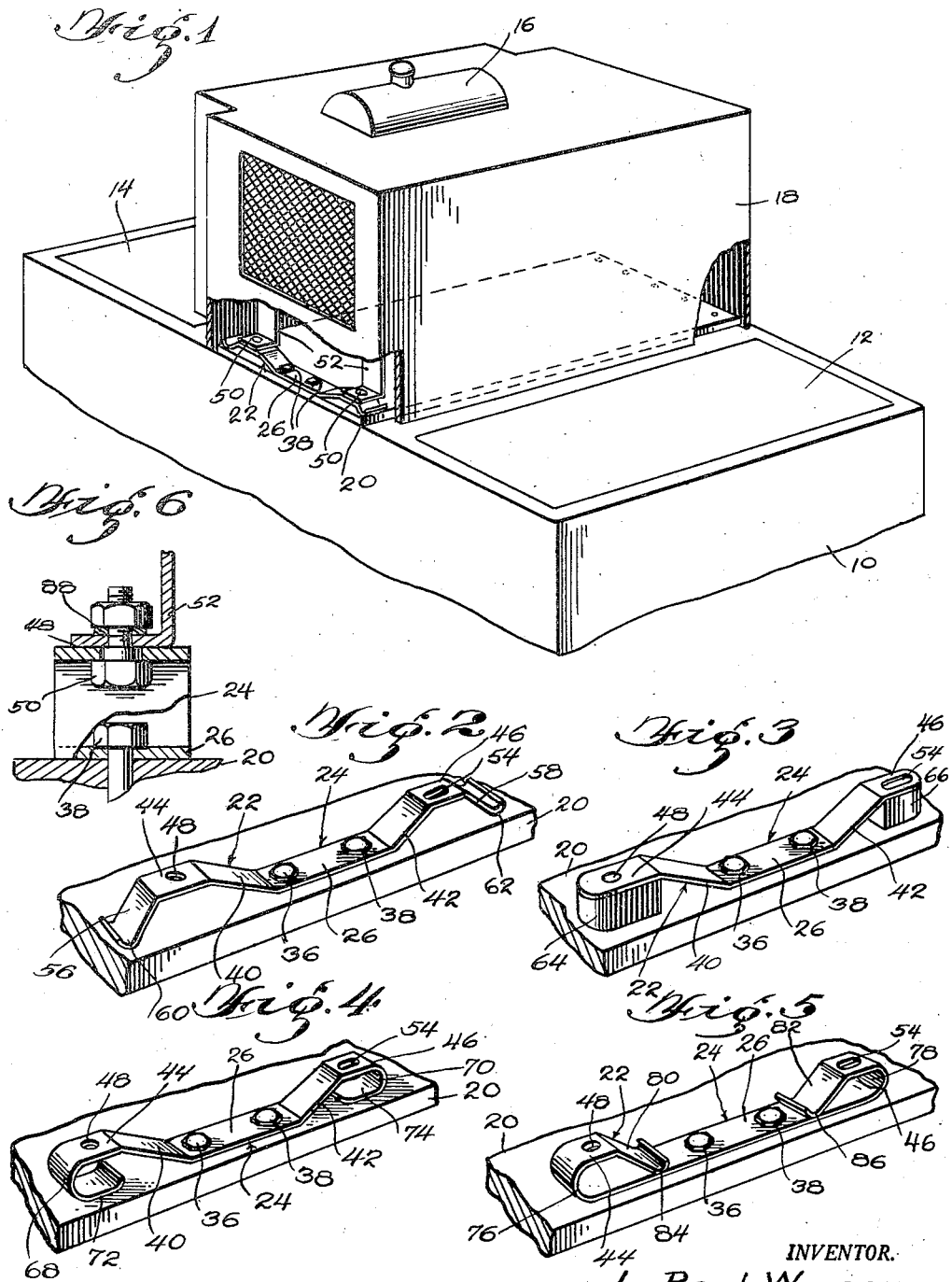
INVENTOR.
Le Roy L. Werner
BY
ATTORNEY Patented Mar. 16, 1948

2,437,717

UNITED STATES PATENT OFFICE 2,437,717

VIBRATION DAMPING MOUNT

Le Roy L. Werner, Washington, D. C.

Application October 27, 1944, Serial No. 560,583

5 Claims. (Cl. 248—20)

(Granted under the act of March 3, 1883, as amended April 30, 1928; 370 O. G. 757)

The invention described herein, if patented, may be manufactured and used by or for the Government for governmental purposes, without the payment to me of any royalty thereon.

This invention relates to vibration damping mounts for securing light weight motors or other vibrating machines to stationary supports and more particularly to a new and improved vibration damper for mounting a refrigerating unit in a refrigerator.

In the construction of mechanical refrigerators some means must be provided for damping the vibrations produced during the operation of the refrigerating unit, in order to reduce wear on the unit and lessen the noise made by the unit while in operation. This is accomplished by interposing vibration dampers between the motor and the chassis of the refrigerator, or by interposing vibration dampers between the refrigerating unit as a whole and the chassis of the refrigerator. Vibration dampers of various types may be found in the prior art, but they all have certain disadvantages which I have sought to overcome in my new and improved damper. A primary consideration in the construction of any mechanical refrigerator, portable or non-portable, is the reduction of space occupied by the refrigerating unit, because this not only reduces the space occupied by the rfrigerator but may also increase the storage space available. One of the disadvantages of the dampers of the prior art which made them unsuitable for use in my portable refrigerator was their height. Furthermore, at least four dampers were required to mount a motor or an operating unit, one being placed under each corner of the motor or unit, and each damper required two or more bolts, or other fastening means, to secure it to the chassis. It was to overcome these and other disadvantages of the prior art that I devised my new and improved damper. One of the objects of my invention is the provision of a new and improved vibration damping mount which may be readily constructed from a single spring tempered metallic bar or strap.

Another object of the invention is the provision of a new and improved vibration damper which is particularly suitable for use with light weight machines.

Another object of the invention is the provision of a new and improved vibration damper in which a pair of mounts are incorporated into a single compact unitary structure of low elevation, so that only two mounts are needed to secure a machine to a support.

Another object of the invention is the provision in a unitary structure containing two mounts of means for permitting relative movement between the mount and machine mounted thereon.

Another object of the invention is the provision of a new and improved vibration damper which requires fewer fastening means to secure the mount to the chassis of a refrigerator.

Another object of the invention is the provision of a new and improved vibration damper which is inexpensive to manufacture, yet durable and sturdy in construction.

These and other objects of the invention will become apparent by reference to the accompanying description and drawings which illustrate several modifications of the invention and in which like numbers refer to like parts throughout the several views.

Fig. 1 is a perspective view, partly in section, showing a refrigerator cabinet with a refrigerating unit and housing therefor installed on the cabinet.

Figs. 2, 3, 4, and 5 are perspective views showing various modifications of my improved vibration damping mount.

Fig. 6 is a fragmentary sectional view showing the manner of securing the mount to the chassis of the refrigerator and the refrigerating unit to the mount.

Referring to the drawings, Fig. 1 shows a fragment of a refrigerator having a cabinet 10 with a pair of doors 12 and 14 in the top thereof. The refrigerating unit 16 is secured to a channel iron base which has downwardly extending feet 52 for securement to vibration dampers. The unit is positioned on the top of the cabinet centrally thereof and is inclosed within a housing 18. A plywood base-board 20 upon which the vibration dampers are mounted is secured to the top of the cabinet by bolts or other suitable means. For securing the refrigerating unit to the base-board 20, I provide the improved vibration damper which will now be described.

In the drawings Figs. 2 to 5 inclusive, I have shown four modifications of my invention. In all of these modifications the damper 22 consists of a body 24 formed from a single spring-tempered metallic bar or strap. The body 24 has a flat centrally located base section 26 along which it is secured to the base-board 20, and plane sections 44 and 46 formed in prolongation of the base section 26 and spaced therefrom vertically and longitudinally. The feet of the refrigerating unit 16 are secured to these elevated sections 44 and 46. Sections 44 and 46 terminate in ends which are variously configurated in the different modifications to give strength and resilience to the mount to support resiliently the refrigerating unit. In all but the modification shown in Fig. 5, the base section 26 of the body 24 extends for approximately one-third the total end to end length of the mount and is pierced by two holes equi-distant from the center for the reception of the anchor bolts 36 and 38 which secure the damper to the base-board 20.

In the modifications shown in Figs. 2, 3, and 4, the body of the damper 24 has sections 40 and 42, inclined upwardly and outwardly from the central base section 26, connecting the base section and the elevated unit supporting sections 44 and 46. One of the elevated sections 44 is bored as at 48 for the reception of a mounting bolt 50 for securing a foot 52 of the refrigerating unit 16 to the section. The other elevated section 46 of the mount 22 is slotted as at 54 to receive a mounting bolt 50 which is free to move in this slot for a purpose which will hereinafter be described.

The various modifications of the invention differ in the configuration of the ends of the body 24. In the modification shown in Fig. 2, the elevated sections 44 and 46 terminate in downwardly directed sections 56 and 58 and the tips of the bar are turned upwardly in a semi-circle to form rests 60 and 62 which seat upon the base-board 20 of the refrigerator.

In the embodiment of the invention shown in Fig. 3, the body 24 terminates at the ends of the elevated sections 44 and 46. These ends are semi-circular in form and are resiliently supported in an elevated position by means of resilient pads or blocks 64 and 66 inserted under the sections 44 and 46 of the mount and forming extensions thereof. These blocks may be formed from rubber, cork or a plastic, and fit snugly under the elevated sections. They cooperate with the inclined portions 40 and 42 of the mount to resiliently support the elevated unit supporting sections 44 and 46. The elevated section 44 has an aperture 48 for the reception of a mounting bolt 50, and section 46 is slotted as at 54 in a manner similar to that described for the corresponding parts of the embodiment shown in Fig. 2. Block 64 has an opening therein for reception of the head of a mounting bolt 50, and block 66 is slotted to permit longitudinal movement therein of the head of a mounting bolt.

In the embodiment shown in Fig. 4, the body 24 beyond the elevated sections 44 and 46 is turned downwardly to form semi-circles 68 and 70. The extreme ends of the bar extend inwardly in the plane of the base section 26 to form rests 72 and 74 which seat on the base-board 20. If so desired, the tips of the bar may be bent upwardly as shown in Fig. 4. In this modification, the elevated sections 44 and 46 are bored and slotted in a manner similar to the embodiment shown in Fig. 2 and previously described.

The modification of the invention shown in Fig. 5 differs from the embodiment shown in Figs. 2 to 4, in that the base section 26 extends for the full end to end length of the mount. The bar is then formed into upwardly turned semi-circles 76 and 78 with the free ends of the bar extending horizontally inwardly in a plane elevated from the base section to form the elevated sections 44 and 46. At the termination of these elevated sections, the bar is bent downwardly and inwardly as at 80 and 82, and the tips are turned up to form rests 84 and 86 which seat upon the base section 26 of the bar. The elevated sections 44 and 46 are bored and slotted in a manner similar to that described for the embodiment shown in Fig. 2.

Each mount 22 is secured to the plywood base-board 20 by means of a pair of anchor bolts 36 and 38 which pass through the openings in the base section of the mount and into the base-board 20. The feet of the refrigerating unit are secured to the elevated sections 44 and 46 by means of mounting bolts 50. The bolt which secures a foot 52 to the section 44 of a mount is locked in position by means of a lock washer 88. The mounting bolt used to secure the opposite foot of the unit to section 46 of the mount passes through the slot 54 and is locked in position, but in such a manner that the bolt is free to move longitudinally in the slot. When the unit is operating the oscillation resulting from the vibration of the unit is cushioned by the mount 22. This cushioning action is effected by a spreading of the inclined sections of the body of the mount. In spreading, the distance between the elevated sections is increased, but the distance between the feet 52 of the unit remains constant, so that some provision must be made to allow for longitudinal movement between at least one foot of the unit and one of the elevated unit supporting sections if the mount is to operate effectively as a vibration damper. The slot 54 in the elevated section 46 is provided for this purpose. As the elevated sections move up and down due to the vibration of the unit, the bolt 50 slides in the slot 54, thus permitting compensation for any variation in the longitudinal distance between the elevated sections 44 and 46.

The dampers 22 are preferably mounted to extend under the ends of the refrigerating unit 16 as shown in Fig. 1, one damper being installed under each end. They may be mounted with the mount extending from end to end of the unit if so desired, but this would require a longer mount and would not result in any increased advantage or efficiency over the end mounting of the dampers.

What I claim as new and desire to secure by Letters Patent is as follows:

1. A mount for securing a machine subject to vibration to a stationary support comprising a body formed from a single strip of spring-tempered metallic bar, said body having a base section for securement to a support, elevated machine supporting sections, inclined sections connecting said base section and said elevated sections, and extensions from the elevated sections supplementing the inclined sections to provide resilient support for said elevated sections for damping the vibrations of said machine.

2. A mount for securing a machine subject to vibration to a stationary support comprising a body formed from a single strip of spring-tempered metallic bar, said body having a base section for securement to a support, elevated machine supporting sections, inclined sections connecting said base section and said elevated sections, and non-metallic means cooperating with said inclined sections to provide resilient support for said elevated sections for damping the vibrations of said machine.

3. A mount for securing a machine subject to vibration to a stationary support comprising a unitary body formed from a spring-tempered metallic bar, said body having a base section for securement to a support, elevated machine supporting sections, inclined sections connecting said base section and said elevated sections, longitudinal rests in the plane of said base section and resilient connections between said longitudinal rests and said elevated sections, said inclined sections and resilient connections cooperating to provide resilient support for said elevated sections to dampen the vibrations of a machine mounted thereon.

4. A mount for securing a machine subject to vibration to a stationary support comprising a body formed from a spring-tempered metallic bar, said body having a base section extending from end to end of said mount, said base section terminating in upwardly turned ends, horizontal elevated sections formed by turning said ends back upon said base section in a plane elevated therefrom, and downwardly and inwardly inclined sections extending from said elevated sections to said base section, said upwardly turned ends and said inclined sections cooperating to resiliently support said elevated sections and dampen the vibration of a machine mounted thereon.

5. A mount for securing a machine, subject to vibration, to a stationary support comprising a resilient metallic bar having a central base section adapted to be secured to a support, and upwardly and inwardly turned ends formed at the extremities of said base section and providing elevated machine supporting sections, said ends terminating in downwardly inclined sections adapted to rest on said base section.

LE ROY L. WERNER.

REFERENCES CITED

The following references are of record in the file of this patent:

UNITED STATES PATENTS

| Number | Name | Date |
| --- | --- | --- |
| 215,515 | Gage et al. | May 20, 1879 |
| 1,511,336 | Hoey | Oct. 14, 1924 |
| 1,815,170 | Summers | July 21, 1931 |
| 2,097,071 | Lichten | Oct. 26, 1937 |
| 2,107,329 | Gleason | Feb. 8, 1938 |
| 2,139,063 | Beach | Dec. 6, 1938 |
| 2,317,190 | Henshaw | Apr. 20, 1943 |
| 2,414,506 | Bowen | Jan. 21, 1947 |